United States Patent [19]

Smith

[11] 4,445,920
[45] May 1, 1984

[54] METHOD OF MAKING GLASS-TO-METAL SEAL (HEADER)

[75] Inventor: Rex L. Smith, Ridgecrest, Calif.

[73] Assignee: The United States of America as represented by the Secretary of the Navy, Washington, D.C.

[21] Appl. No.: 450,861

[22] Filed: Dec. 20, 1982

[51] Int. Cl.³ .............................................. C03C 29/00
[52] U.S. Cl. ..................................... 65/59.21; 65/32; 65/59.23; 65/59.24; 65/59.27; 65/59.4; 65/59.5; 65/59.6
[58] Field of Search .................. 65/59.21, 59.23, 59.24, 65/59.25, 59.27, 59.4, 59.5, 59.6, 32

[56] References Cited

U.S. PATENT DOCUMENTS

| | | | |
|---|---|---|---|
| 3,326,618 | 6/1967 | Casamo et al. | 65/59.23 x |
| 4,198,225 | 4/1980 | Patrick et al. | 65/59.6 X |
| 4,292,464 | 9/1981 | Vogt et al. | 65/59.5 X |
| 4,352,951 | 10/1982 | Kyle | 65/59.5 X |
| 4,377,404 | 3/1983 | Hoshikawa et al. | 65/59.27 |

FOREIGN PATENT DOCUMENTS 866371  2/1953  Fed. Rep. of Germany ..... 65/59.27

Primary Examiner—Robert L. Lindsay, Jr.
Attorney, Agent, or Firm—R. F. Beers; W. Thom Skeer; Kenneth G. Pritchard

[57] ABSTRACT

A metal-to-glass-to-metal seal that includes a chemical bond between the glass and metal as well as a mechanical seal is obtained by using an oxide layer which joins the glass and metal. A glass tube or glass powder with a coefficient of expansion which approximates the metal's coefficient of expansion is fitted between a pin and sleeve combination. Parts are then heated in a controlled dry hydrogen atmosphere to create a bond between the metal and glass.

8 Claims, 2 Drawing Figures

METHOD OF MAKING GLASS-TO-METAL SEAL (HEADER)

BACKGROUND OF THE INVENTION

1. Field of the Invention

This invention pertains to electro-explosive devices and other electrical components that require glass-to-metal seals. Specifically, this invention pertains to a method of attaining a hermetic seal between glass and stainless steel where both mechanical and chemical bonds are formed in a metal-to-glass-to-metal three-layer arrangement.

2. Description of the Prior Art

A large spectrum of commercial glass-to-metal seals are known. In some cases, an outer metal layer is added to form a metal-to-glass-to-metal sandwich. These methods use various devices to obtain a stable relationship between the metal and glass. Several prior art seals have claimed "matched coefficients" between the glass and metal. The basic metal used in such seals is that known commercially as Kovar. These glass-to-metal seals use a non-stainless steel and a soft glass to provide a hermetic seal. The finished part is frequently plated with gold or other similar metals to provide a reliable electrical path on the outside of the glass. The glass is usually porous and will not withstand severe shock due to thermal or impact conditions.

These previous glass-to-metal seals, including metal-to-glass-to-metal, which are sometimes described as bonded, are actually to press fit. The chemical bond is actually a glass-to-metal oxide bond that is pressed against the metal or metal-to-metal oxide bond. The glass contains stress fractures. No actual bond has been formed between glass and metal. Stainless steel has not been previously used. The closest approach to an actual stainless steel is U.S. Pat. No. 2,394,919 to Kingston for a Metal-Glass Seal and Sealing Alloy. This patent uses a stainless alloy of 38–45% nickel and 3–15% chromium with the rest iron. A chromium oxide layer is created by heating in a moist hydrogen atmosphere to facilitate a vacuum tight seal between the metal and glass. The atmosphere controls the type of oxide formed. A moist hydrogen atmosphere was believed to be necessary to form oxides capable of bonding glass to metal. The Kingston method forms a black film on the metal which is a glue joint bond. A glue joint bond is one where the upper and lower layers of material form chemical bonds with the glue, but not with each other. Within the Kingston patent it is noted that the alloy used is a new alloy specifically created for this type of glass-to-metal seal. This particular prior art patent was designed for use in vacuum tube techniques. U.S. Pat. No. 2,697,309 to Gates for a Method of Making Tubular Glass-to-Metal Seals also refers to using an alloy material of Kingston to take advantage of the oxidation which improves the glass-to-metal seal characteristics.

FIG. 1 shows a cross-sectional view of these prior art glass-to-metal bonds. A glass layer 10 surrounds a metal pin 12. The oxidation of the metal forming pin 12 is itself a chemical bonded layer 16. The oxide forms a chemical bond with glass 10 which is shown by layer 18. The oxide serves as glue with its upper portion forming a chemical bonded layer 18 with glass 10 and its lower portion forming a chemical bonded layer 16 with metal 12. If an additional metal layer is added around glass 10 it must be thick enough to cause compression bonding of glass 10 to pin 12 if the coefficients of expansion of the glass and metal is not exact. An outer metal layer will have the two oxide bonded layers 16 and 18 in the same relative position between the glass-to-metal interface. No actual glass-metal bonds exist.

None of the known prior art forms complex iron-nickel-chromium oxide which forms a true chemical bond between metal and glass. None of the known prior art has the top and bottom surface of a glass layer bonded chemically and mechanically to metal.

SUMMARY OF THE INVENTION

Glass is bonded to metal by the use of an oxide layer generated during the firing, heating of the glass and metal. A metal pin and metal sleeve assembly is used with a glass tube with approximately the same coefficient expansion of the stainless steel. An exact match is not required. The inert parts are placed in a furnace and heated to approximately 1050°. The bonding takes place in a dry hydrogen atmosphere. The metal sleeve can be very thin and still form a tight bond to the glass tube.

DESCRIPTION OF THE PREFERRED EMBODIMENT

Figure 2:
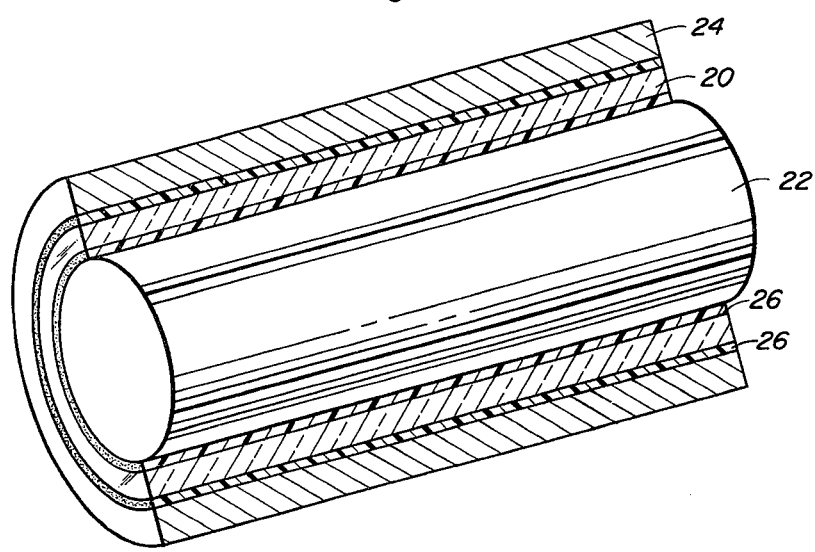
FIG. 2 is a cross-sectional view of the present invention.
Figure 1:
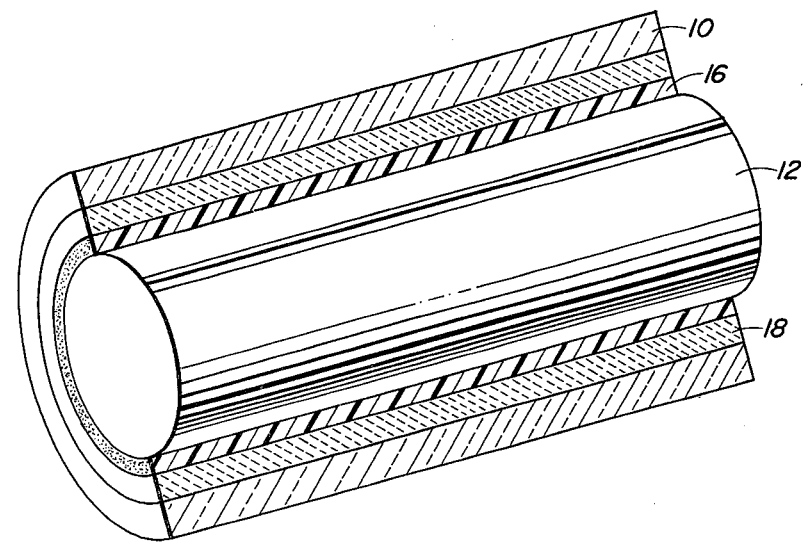
FIG. 1 is a cross-sectional view of a prior art glass-to-metal bond.

FIG. 2 shows a glass tube 20 between a metal pin 22 and a metal sleeve 24. Glass tube 20 does not have to be made of a soft glass, it can be a hard glass since an exact coefficient of expansion match of metal to glass is not needed. Metal pin 22 and metal sleeve 24 are any of numerous stainless steel alloys which contain nickel and chromium or other stainless steel alloys. These alloys create a layer of iron-nickel-chromium oxide or other oxide complexes on the surface of the glass when the glass is heated. The glass tube is glass powder prior to the application of heat.

The complex oxide layer permits the metal and glass to merge and form a chemical bond between the metal, oxide, and glass represented by layers 26. Previously, the oxides formed only independent chemical bonds between the oxide and the metal and the oxide and the glass. The effect of having a true chemical bond is to permit stretching of the bonded layers 26 when different coefficients of expansion are present. When the coefficients of expansion are so different that they cause a gap larger than the elastic limits of layers 26, separation will occur. Metal pin 22 is inserted in metal sleeve 24 to form a pin and sleeve combination. Glass is used to fill the space between them. At normal room temperatures both sleeve 24 and pin 22 are inert and do not react with the glass. They are placed in a furnace and heated to approximately 1050° C. for about five minutes. Formation of the oxide layer on the inside surface of metal sleeve 24 while glass reflows into glass tube 20 permits the bonding to take place between the glass and stainless steel surfaces in the presence of the oxide, if the furnace is maintained with a dry hydrogen atmosphere. A dry hydrogen atmosphere has a water vapor content of 5–20%. This contrasts with a moist hydrogen atmosphere which has over 50% water vapor content. Parts are then cooled and removed from the furnace. The metal and glass combination are now sealed by an actual chemical bond into a hermetic solid glass header. There are no stress fractures in the glass although there may be a few spots where the glass failed to wet the metal. At these locations no bonding exists. The only possible contact is if compression bonding is present. However, thin metal layers do not provide compression bonding. The device can now be polished for use in integrated circuits, electro-explosive devices, EEDs, and other similar applications.

The bonding of the glass to stainless steel avoids the normal plating cost since sleeve 24 is already in place. The bond provides an optical path due to the avoidance of stress fractures. Glass tube 20 serves as an electrical insulator between pin 22 and sleeve 24.

It is obvious to those skilled in the art that various glasses and metals can be bonded in this manner with the addition of special inert gas.

What is claimed is:

1. A method of forming a three-tier glass and metal component with mechanical and chemical bonds between the glass and metal comprising the steps of:
   placing a glass rod between a metal sleeve and a metal pin, said glass rod having a coefficient of expansion that approximates said metal pin and metal sleeve;
   heating said pin, rod, and sleeve to 1050° C. for five minutes in a furnace; and
   maintaining a dry hydrogen atmosphere in said furnace during said heating step.

2. A method of forming a three-tier glass and metal component with mechanical and chemical bonds between the glass and metal as described in claim 1 wherein said metal pin and sleeve comprise stainless steel.

3. A method of forming a three-tier glass and metal component with mechanical and chemical bonds between the glass and metal as described in claim 1 where said dry hydrogen atmosphere comprises a hydrogen atmosphere with water vapor content in the range of 5% to 20%.

4. A method of forming a three-tier glass and metal component with mechanical and chemical bonds between the glass and metal as described in claim 2 where said dry hydrogen atmosphere comprises a hydrogen atmosphere with water vapor content in the range of 5% to 20%.

5. A method of forming a three-tier glass and metal component with mechanical and chemical bonds between the glass and metal comprising the steps of:
   placing a glass powder between a metal sleeve and a metal pin, said glass powder having a coefficient of expansion that approximates said metal pin and metal sleeve;
   heating said pin, powder, and sleeve to 1050° C. for five minutes in a furnace; and
   maintaining a dry hydrogen atmosphere in said furnace during said heating step.

6. A method of forming a three-tier glass and metal component with mechanical and chemical bonds between the glass and metal as described in claim 4 where said metal pin and sleeve comprise stainless steel.

7. A method of forming a three-tier glass and metal component with mechanical and chemical bonds between the glass and metal as described in claim 4 where said dry hydrogen atmosphere comprises a hydrogen atmosphere with water vapor content in the range of 5% to 20%.

8. A method of forming a three-tier glass and metal component with mechanical and chemical bonds between the glass and metal as described in claim 5 where said dry hydrogen atmosphere comprises a hydrogen atmosphere with water vapor content in the range of 5% to 20%.

* * * * *